United States Patent
Shukla (10) Patent No.: US 9,493,249 B2
(45) Date of Patent: Nov. 15, 2016

(54) SYSTEM AND METHOD FOR PROVIDING AN AIRCRAFT NOISE ADVISORY DURING DEPARTURE AND ARRIVAL OF AN AIRCRAFT

(71) Applicant: AIRBUS ENGINEERING CENTRE INDIA, Bangalore (IN)

(72) Inventor: Vijay Shukla, Bangalore (IN)

(73) Assignee: AIRBUS GROUP INDIA PRIVATE LIMITED, Bangalore, Karnataka (IN)

( * ) Notice: Subject to any disclaimer, the term of this patent is extended or adjusted under 35 U.S.C. 154(b) by 724 days.

(21) Appl. No.: 13/744,429

(22) Filed: Jan. 18, 2013

(65) Prior Publication Data

US 2013/0190950 A1   Jul. 25, 2013

(30) Foreign Application Priority Data

Jan. 24, 2012   (IN) .............................. 288/CHE/2012

(51) Int. Cl.
- G05D 3/00 (2006.01)
- B64D 45/00 (2006.01)
- G01H 17/00 (2006.01)
- G08G 5/00 (2006.01)
- G06F 17/00 (2006.01)

(52) U.S. Cl.
CPC .............. B64D 45/00 (2013.01); G01H 17/00 (2013.01); G06F 17/00 (2013.01); G08G 5/0021 (2013.01)

(58) Field of Classification Search
USPC .............................................. 701/3, 8–9, 10
See application file for complete search history.

(56) References Cited

U.S. PATENT DOCUMENTS

| | | | |
|---|---|---|---|
| 6,201,872 B1 * | 3/2001 | Hersh et al. ................. | 381/71.5 |
| 7,383,104 B2 * | 6/2008 | Ishii et al. ........................ | 701/3 |
| 2005/0098681 A1 | 5/2005 | Berson et al. | |
| 2009/0132106 A1 | 5/2009 | DeJonge et al. | |
| 2011/0001637 A1 | 1/2011 | Spiegel | |
| 2011/0043382 A1 | 2/2011 | Wang | |
| 2011/0046818 A1 * | 2/2011 | Herkes et al. .................... | 701/3 |
| 2011/0066411 A1 * | 3/2011 | Morio et al. ...................... | 703/2 |
| 2011/0118908 A1 * | 5/2011 | Boorman et al. ............... | 701/14 |

FOREIGN PATENT DOCUMENTS

EP    2287822 A2    2/2011

OTHER PUBLICATIONS

European Search Report—EP Application No. 13150861—European Patent Office, Munich—Apr. 11, 2013.

* cited by examiner

*Primary Examiner* — Hussein A. Elchanti (74) *Attorney, Agent, or Firm* — Prakash Nama; Global IP Services, PLLC (57) ABSTRACT

A system and method for providing an aircraft noise advisory during departure and/or arrival of an aircraft are disclosed. In one embodiment, predefined allowable aircraft noise level information associated with a plurality of aircraft noise sensors located in the vicinity of airports are obtained. Further, predefined allowable aircraft noise level information associated with one or more of the plurality of aircraft noise sensors is presented on a display device in the aircraft, based on a current location of the aircraft, upon receiving noise data request from a pilot. Furthermore, current aircraft noise level information is obtained from one of the one or more aircraft noise sensors. In addition, the current aircraft noise level information is compared with predefined allowable aircraft noise level information associated with the one of the one or more aircraft noise sensors. Also, the aircraft noise advisory is displayed based on an outcome of the comparison.

31 Claims, 6 Drawing Sheets

SYSTEM AND METHOD FOR PROVIDING AN AIRCRAFT NOISE ADVISORY DURING DEPARTURE AND ARRIVAL OF AN AIRCRAFT

RELATED APPLICATION

Benefit is claimed under 35 U.S.C. 119(a)-(d) to Foreign Application Serial No. 288/CHE/2012, filed in INDIA entitled "SYSTEM AND METHOD FOR PROVIDING AN AIRCRAFT NOISE ADVISORY DURING DEPARTURE AND ARRIVAL OF AN AIRCRAFT" by Airbus Engineering Centre India, filed on Jan. 24, 2012, which is herein incorporated in its entirety by reference for all purposes.

FIELD OF TECHNOLOGY

Embodiments of the present subject matter relate to providing an aircraft noise advisory. More particularly, embodiments of the present subject matter relate to providing the aircraft noise advisory during departure and/or arrival of an aircraft.

BACKGROUND

Typically, during departure and/or arrival of an aircraft, high levels of aircraft noise are generated. Generally, airports require predefined allowable aircraft noise levels to be maintained by the aircraft during departure and/or arrival. The predefined allowable aircraft noise levels are specified for specific locations in the vicinity of the airports. To maintain the aircraft noise within the predefined allowable aircraft noise levels, noise abatement procedures are used by a pilot.

Typically, a flight management system (FMS) in the aircraft generates a noise abatement procedure flight path optimized to reduce the aircraft noise. This enables the pilot to control aircraft thrust, aircraft speed and/or other such aircraft performance parameters, predicted by the FMS, to reduce the aircraft noise. In some scenarios, considering non-availability of the aircraft performance parameters or aircraft safety, the pilot may prefer to perform the departure and/or arrival of the aircraft manually, which may result in overriding the noise abatement procedure flight path suggested by the FMS and may lead to exceeding the predefined allowable aircraft noise levels.

Some airports perform aircraft noise monitoring using aircraft noise monitoring stations which monitor the aircraft noise induced in the vicinity of the airports during the departure and/or arrival of the aircraft. The aircraft noise monitoring stations then compare the aircraft noise with the predefined allowable aircraft noise levels at the specific locations in the vicinity of the airports. Further, airport authorities provide the pilot with the noise abatement procedures to be performed during the departure and/or arrival of the aircraft. However, it is likely that the pilot may not follow the noise abatement procedures, provided by the airport authorities, due to lack of understanding of the noise abatement procedures, aircraft safety concerns and the like.

SUMMARY

A system and method for providing an aircraft noise advisory during departure and/or arrival of an aircraft are disclosed. According to one aspect of the present subject matter, predefined allowable aircraft noise level information associated with each of a plurality of aircraft noise sensors located in the vicinity of airports is obtained. Further, an aircraft noise sensor identification and aircraft noise sensor location information associated with each of the plurality of aircraft noise sensors are obtained.

In addition, predefined allowable aircraft noise level information associated with one or more of the plurality of aircraft noise sensors is presented on a display device in the aircraft, based on a current location of the aircraft, upon receiving a noise data request from a pilot. Moreover, current aircraft noise level information is obtained from one of the one or more aircraft noise sensors during the departure and/or arrival of the aircraft. Also, the current aircraft noise level information is compared with predefined allowable aircraft noise level information associated with the one of the one or more aircraft noise sensors. Based on an outcome of the comparison, the aircraft noise advisory is displayed on the display device.

According to another aspect of the present subject matter, the aircraft includes a flight management system (FMS), a communication management unit coupled to the FMS and cockpit display devices coupled to the FMS. The cockpit display devices include a navigation display device and a flight warning and alert display device. In one embodiment, the FMS obtains the predefined allowable aircraft noise level information associated with each of the plurality of aircraft noise sensors located in the vicinity of airports. Further, the FMS presents the predefined allowable aircraft noise level information associated with the one or more of the plurality of aircraft noise sensors on the navigation display device, based on the current location of the aircraft, upon receiving the noise data request from the pilot. The communication management unit then obtains the current aircraft noise level information from the one of the one or more aircraft noise sensors during the departure and/or arrival. Furthermore, the FMS compares the current aircraft noise level information with the predefined allowable aircraft noise level information associated with the one of the one or more aircraft noise sensors. Moreover, the FMS displays the aircraft noise advisory on the navigation display device and the flight warning and alert display device based on the outcome of the comparison.

According to yet another aspect of the present subject matter, the system for providing the aircraft noise advisory during the departure and/or arrival of the aircraft includes the plurality of aircraft noise sensors, a plurality of aircraft noise monitoring stations, a plurality of airline operable stations and the FMS in the aircraft. In one embodiment, each of the plurality of aircraft noise monitoring stations is coupled to associated one or more of the plurality of aircraft noise sensors. Further, each of the plurality of airline operable stations is coupled to an associated one of the plurality of aircraft noise monitoring stations. Furthermore, the FMS in the aircraft is communicatively coupled to one of the plurality of aircraft noise monitoring stations via an associated one of the plurality of airline operable stations based on the current location of the aircraft. In this embodiment, the FMS in the aircraft performs the method described above.

According to yet another aspect of the present subject matter, at least one non-transitory computer-readable storage medium for providing the aircraft noise advisory during departure and/or arrival of the aircraft having instructions that, when executed by a computing device, cause the computing device to perform the method described above.

The methods and systems disclosed herein may be implemented in any means for achieving various aspects. Other features will be apparent from the accompanying drawings and from the detailed description that follow.

BRIEF DESCRIPTION OF THE DRAWINGS

Various embodiments are described herein with reference to the drawings, wherein.

The drawings described herein are for illustration purposes only and are not intended to limit the scope of the present disclosure in any way.

DETAILED DESCRIPTION

A system and method for providing an aircraft noise advisory during departure and/or arrival of an aircraft are disclosed. In the following detailed description of the embodiments of the present subject matter, references are made to the accompanying drawings that form a part hereof, and in which are shown by way of illustration specific embodiments in which the present subject matter may be practiced. These embodiments are described in sufficient detail to enable those skilled in the art to practice the present subject matter, and it is to be understood that other embodiments may be utilized and that changes may be made without departing from the scope of the present subject matter. The following detailed description is, therefore, not to be taken in a limiting sense, and the scope of the present subject matter is defined by the appended claims.

Figure 1:
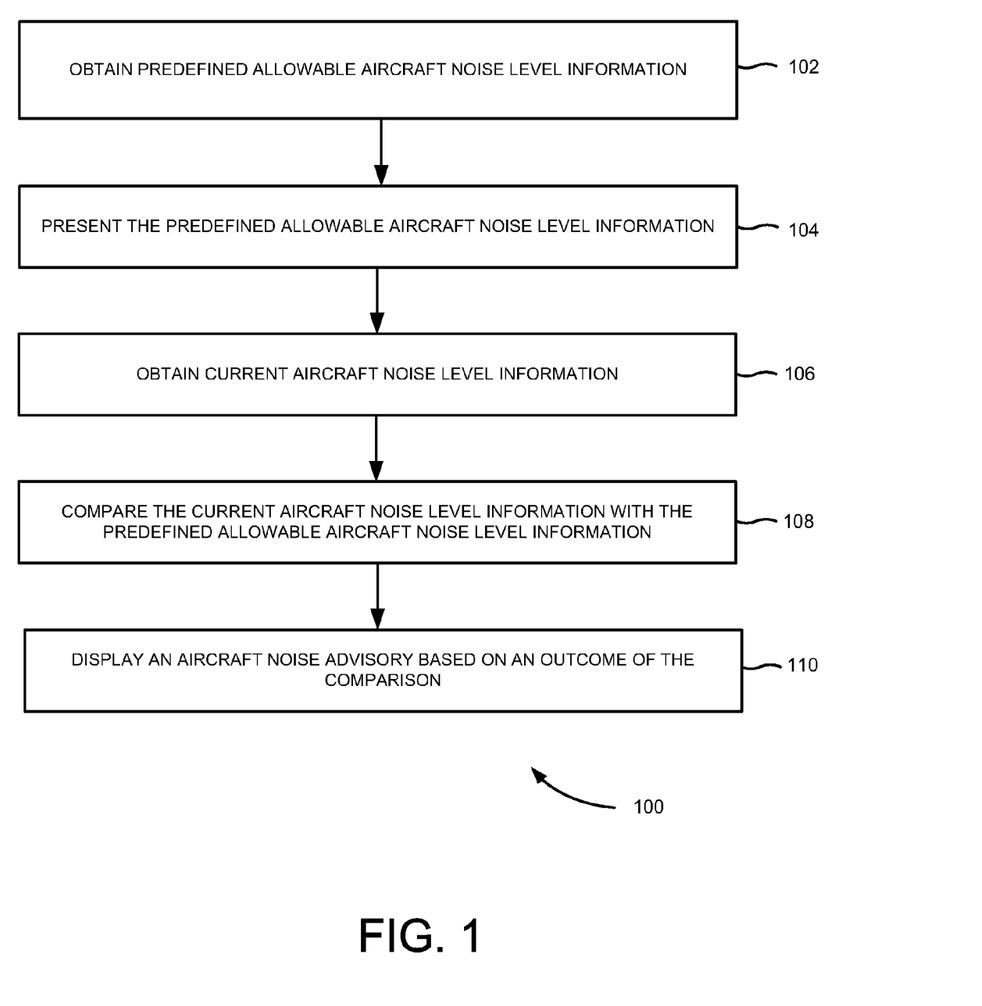
FIG. 1 illustrates a flow diagram of an exemplary method for providing an aircraft noise advisory during departure and/or arrival of an aircraft.

FIG. 1 illustrates a flow diagram 100 of an exemplary method for providing an aircraft noise advisory during departure and/or arrival of an aircraft. At block 102, predefined allowable aircraft noise level information associated with each of a plurality of aircraft noise sensors located in the vicinity of airports are obtained. For example, the plurality of aircraft noise sensors include a plurality of fixed aircraft noise sensors and a plurality of mobile aircraft noise sensors. This is explained in more detail with reference to FIG. 2. Further, an aircraft noise sensor identification and aircraft noise sensor location information associated with each of the plurality of aircraft noise sensors located in the vicinity of airports are obtained. In one embodiment, the obtained predefined allowable aircraft noise level information, aircraft noise sensor identification and/or aircraft noise sensor location information associated with each of the plurality of aircraft noise sensors are stored in a noise database.

At block 104, predefined allowable aircraft noise level information associated with one or more of the plurality of aircraft noise sensors is presented on a display device in the aircraft, based on a current location of the aircraft, upon receiving a noise data request from a pilot. In one embodiment, the predefined allowable aircraft noise level information associated with the one or more of the plurality of aircraft noise sensors are obtained by searching the noise database. This is explained in more detail with reference to FIG. 4. Exemplary display device includes a navigation display device and the like. This is explained in more detail with reference to FIG. 3.

At block 106, current aircraft noise level information is obtained from one of the one or more aircraft noise sensors during the departure and/or arrival. For example, the one of the one or more aircraft noise sensors is located in a zone where the aircraft is about to fly over. This is explained in more detail with reference to FIG. 2. At block 108, the current aircraft noise level information is compared with predefined allowable aircraft noise level information associated with the one of the one or more aircraft noise sensors. At block 110, the aircraft noise advisory is displayed, to the pilot, on the display device based on an outcome of the comparison. For example, the aircraft noise advisory includes suggested aircraft performance parameters and a predicted flight path based on the suggested aircraft performance parameters. Exemplary suggested aircraft performance parameters include an aircraft speed, an aircraft thrust, an aircraft altitude, an aircraft climb/descent rate, an aircraft flap setting and the like. This is explained in more detail with reference to FIGS. 3 and 5. Exemplary display device includes the navigation display device, a flight warning and alert display device and the like. In one embodiment, the aircraft noise advisory includes displaying an alert message on the display device. This is explained in more with reference to FIG. 3.

Figure 2:
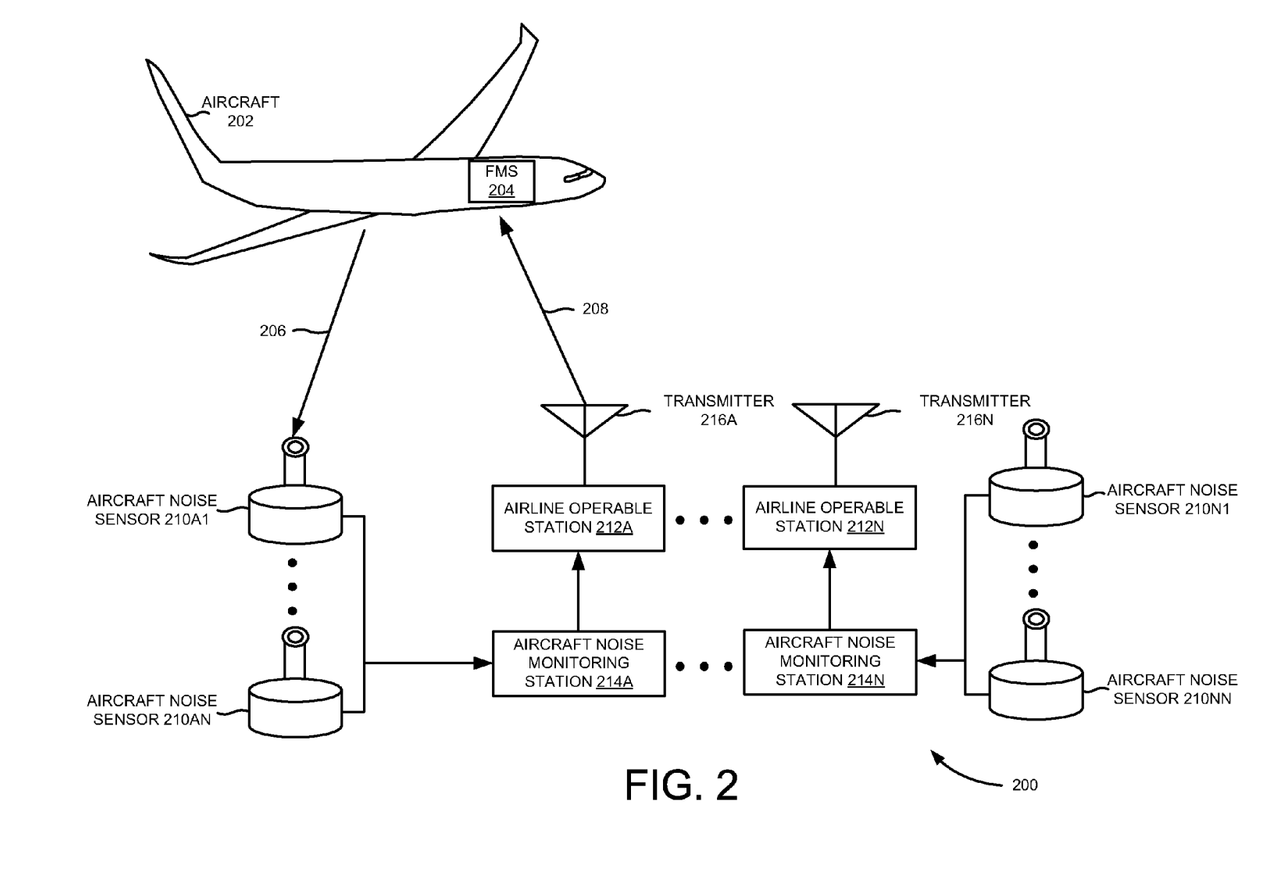
FIG. 2 is a schematic illustrating the aircraft in communication with an aircraft noise sensor, according to one embodiment.

Referring now to FIG. 2, which is a schematic 200 that illustrates an aircraft 202 in communication with one of a plurality of aircraft noise sensors 210A1-AN to 210N1-NN, according to one embodiment. As shown in FIG. 2, the schematic 200 illustrates the aircraft 202, the plurality of aircraft noise sensors 210A1-AN to 210N1-NN, a plurality of aircraft noise monitoring stations 214A-N, a plurality of airline operable stations 212A-N and a plurality of transmitters 216A-N. Exemplary aircraft noise sensors include fixed aircraft noise sensors and movable aircraft noise sensors. Exemplary aircraft noise monitoring stations include fixed aircraft noise monitoring stations and movable aircraft noise monitoring stations. For example, each of the aircraft noise sensors 210A1-AN to 210N1-NN is located in the vicinity of airports, within the airports or in any other location included in an aircraft flying zone. Further, as shown in FIG. 2, the aircraft 202 includes a flight management system (FMS) 204.

Furthermore as shown in FIG. 2, each of the aircraft noise sensors 210A1-AN to 210N1-NN is disposed around an associated one of the aircraft noise monitoring stations 214A-N. For example, the aircraft noise sensors 210A1-AN located in the vicinity of an airport, for example, an airport A, are coupled to the aircraft noise monitoring station 214A and the aircraft noise sensors 210N1-NN located in the vicinity of another airport, for example, an airport N, are coupled to the aircraft noise monitoring station 214N. In addition as shown in FIG. 2, each of the aircraft noise monitoring stations 214A-N is coupled to an associated one of the airline operable stations 212A-N. For example, each of the airports includes an associated one of the airline operable stations 212A-N. Moreover as shown in FIG. 2, each of the airline operable stations 212A-N is coupled to an associated one of the transmitters 216A-N. Also as shown in FIG. 2, the FMS 204 in the aircraft 202 is communicatively coupled to one of the plurality of aircraft noise monitoring stations 214A-N via an associated one of the plurality of airline operable stations 212A-N.

Generally, airports specify predefined allowable aircraft noise levels to be maintained during departure and/or arrival of aircrafts. The predefined allowable aircraft noise levels are specified for specific locations in the vicinity of the airports. For example, the predefined allowable aircraft noise levels associated with the airports are defined, by airport authorities, based on location of the airports. For example, the predefined allowable aircraft noise levels associated with the airports are defined based on residents, industries and/or administrative zones in the vicinity of the airports. In this embodiment, each of the aircraft noise sensors 210A1-AN to 210N1-NN is associated with a predefined allowable aircraft noise level defined by an associated airport. For example, predefined allowable aircraft noise levels are defined for the airport A at specific locations in the vicinity of the airport A, based on location of the airport A. Further, each of the aircraft noise sensors 210A1-AN in the airport A is associated with a corresponding one of the predefined allowable aircraft noise levels defined for the airport A, based on location of the aircraft noise sensors 210A1-AN.

In operation, the FMS 204 obtains the predefined allowable aircraft noise level information, aircraft noise sensor identification and/or aircraft noise sensor location information associated with each of the aircraft noise sensors 210A1-AN to 210N1-NN. The aircraft noise sensor identification is a unique identification associated with each of the aircraft noise sensors 210A1-AN to 210N1-NN. The aircraft noise sensor location information associated with each of the aircraft noise sensors 210A1-AN to 210N1-NN provides information about position of respective aircraft noise sensors. For example, the predefined allowable aircraft noise level information, aircraft noise sensor identification and/or aircraft noise sensor location information associated with each of the aircraft noise sensors 210A1-AN to 210N1-NN are obtained, by the FMS 204, from associated airport authorities.

Further in operation, during the departure and/or arrival of the aircraft 202, one or more of the plurality of aircraft noise sensors 210A1-AN to 210N1-NN, are located in the vicinity of the aircraft 202. For example, when the aircraft 202 is in the airport A, one or more of the aircraft noise sensors 210A1-AN are located in the vicinity of the aircraft 202. Furthermore in operation, one of the one or more aircraft noise sensors 210A1-AN to 210N1-NN located in a zone where the aircraft 202 is about to fly over, senses and records the current aircraft noise level induced by the aircraft 202. For example, the aircraft noise sensor 210A1, located in the zone where the aircraft 202 is about to fly over, senses and records the current aircraft noise level induced by the aircraft 202, as shown in FIG. 2.

In one exemplary implementation, the aircraft noise sensor 210A1 senses the current aircraft noise level induced by the aircraft 202. This is indicated by an arrow 206. Further, the aircraft noise sensor 210A1 transmits the recorded current aircraft noise level information to the associated aircraft noise monitoring station 214A. Furthermore, the aircraft noise monitoring station 214A transmits the current aircraft noise level information to the associated airline operable station 212A. The airline operable station 212A then transmits the current aircraft noise level information to the aircraft 202 via the associated transmitter 216A. This is indicated by an arrow 208. Particularly, the current aircraft noise level information is transmitted to the FMS 204 in the aircraft 202 via a communication management unit (e.g., a communication management unit 320 of FIG. 3) in the aircraft 202. In addition, the FMS 204 compares the current aircraft noise level information with predefined allowable aircraft noise level information associated with the aircraft noise sensor 210A1. Based on an outcome of the comparison, the aircraft noise advisory is displayed to a pilot in the aircraft 202. This is explained in more detail with reference to FIG. 3.

In another exemplary implementation, the aircraft noise sensor 210A1 senses the current aircraft noise level induced by the aircraft 202. Further, the aircraft noise sensor 210A1 transmits the recorded current aircraft noise level information to the associated aircraft noise monitoring station 214A. Furthermore, the aircraft noise monitoring station 214A compares the current aircraft noise level information with the predefined allowable aircraft noise level information associated with the aircraft noise sensor 210A1. In addition, the aircraft noise monitoring station 214A transmits the outcome of the comparison to the FMS 204 via the communication management unit 320. Moreover, based on the obtained outcome of the comparison, the aircraft noise advisory is displayed to the pilot in the aircraft 202. This is explained in more detail with reference to FIG. 3.

In yet another exemplary implementation, the aircraft noise sensor 210A1 senses the current aircraft noise level induced by the aircraft 202. Further, the aircraft noise sensor 210A1 transmits the current aircraft noise level information to the FMS 204 in the aircraft 202. Furthermore, the FMS 204 compares the current aircraft noise level information with the predefined allowable aircraft noise level information associated with the aircraft noise sensor 210A1. Based on the outcome of the comparison, the aircraft noise advisory is displayed to the pilot in the aircraft 202. This is explained in more detail with reference to FIG. 3.

Figure 3:
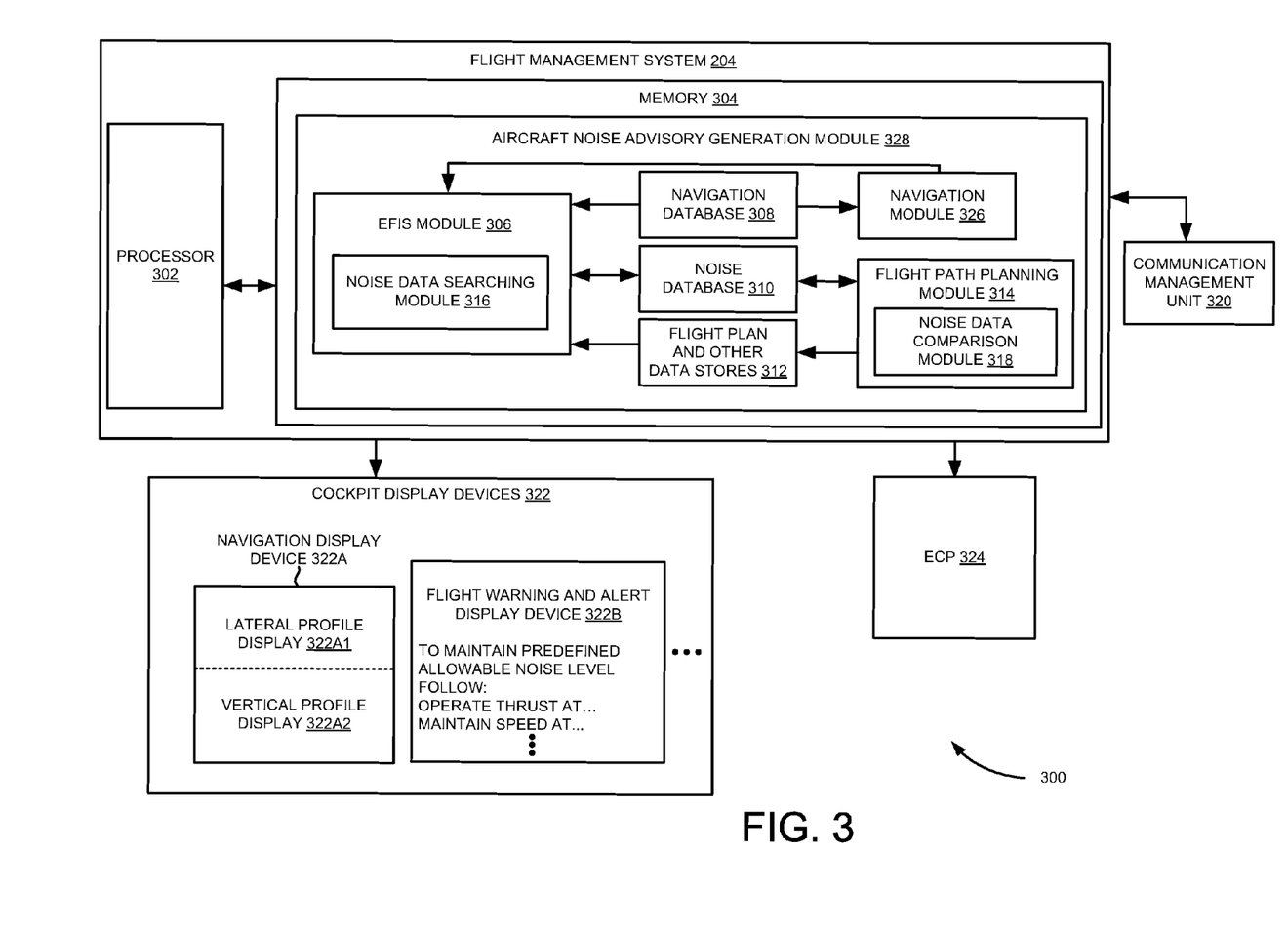
FIG. 3 is a block diagram illustrating major components of a flight management system (FMS) in the aircraft, such as the one shown in FIG. 2, for providing the aircraft noise advisory to a pilot, using the process shown in FIG. 1, according to one embodiment.

Referring now to FIG. 3, which is a block diagram 300 illustrating major components of the FMS 204 in the aircraft 202, such as the one shown in FIG. 2, for providing the aircraft noise advisory to the pilot, using the process shown in FIG. 1, according to one embodiment. As shown in FIG. 3, the FMS 204 includes a processor 302 and memory 304. Further as shown in FIG. 3, an aircraft noise advisory generation module 328 residing in the memory 304 includes an electronic flight instrumentation system (EFIS) module 306, a navigation database 308, a noise database 310, a flight plan and other data stores 312, a flight path planning module 314 and a navigation module 326. Furthermore, the flight path planning module 314 includes a noise data comparison module 318. In addition, the EFIS module 306 includes a noise data searching module 316. In some embodiments, the flight path planning module 314 includes the noise data searching module 316 and the noise data comparison module 318. Also, the FMS 204 is interfaced with cockpit display devices 322, an EFIS control panel (ECP) 324 and the communication management unit 320. The cockpit display devices 322 include a navigation display device 322A and a flight warning and alert display device 322B. Further, the navigation display device 322A includes a lateral profile display 322A1 and a vertical profile display 322A2.

Furthermore as shown in FIG. 3, the processor 302 is coupled to the memory 304. In addition, the EFIS module 306 is coupled to the navigation database 308, the noise database 310, the flight plan and other data stores 312 and the navigation module 326. Moreover, the flight path planning module 314 is coupled to the noise database 310 and the flight plan and other data stores 312. Also, the navigation database 308 is coupled to the navigation module 326.

In operation, the FMS 204 obtains the predefined allowable aircraft noise level information, aircraft noise sensor identification and/or aircraft noise sensor location information associated with each of the aircraft noise sensors 210A1-AN to 210N1-NN, shown in FIG. 2. The predefined allowable aircraft noise level, aircraft noise sensor identification and/or aircraft noise sensor location information associated with each of the aircraft noise sensors 210A1-AN to 210N1-NN are explained in detail with reference to FIG. 2. In one embodiment, the FMS 204 stores the obtained predefined allowable aircraft noise level information, aircraft noise sensor identification and/or aircraft noise sensor location information associated with each of the aircraft noise sensors 210A1-AN to 210N1-NN in the noise database 310.

Further in operation, the FMS 204 receives a noise data request from the pilot in the aircraft 202, shown in FIG. 2. For example, the noise data request is provided to the FMS 204 by the pilot using a switch (e.g., a noise data option switch (NSD) 600 of FIG. 6) in the ECP 324. This is explained in detail with reference to FIG. 6. Upon receiving the noise data request from the pilot, the EFIS module 306 obtains the current location of the aircraft 202 from the navigation module 326. For example, the navigation module 326 is configured to compute the current location of the aircraft 202 using sensors, such as global positioning system (GPS), inertial reference system (IRS), radio, distance measuring equipment (DME) and the like in the aircraft 202. Particularly, the noise data searching module 316 in the EFIS module 306 obtains the current location of the aircraft 202 from the navigation module 326. Based on the current location of the aircraft 202, the noise data searching module 316 obtains predefined allowable aircraft noise level information associated with one or more of the aircraft noise sensors 210A1-AN to 210N1-NN by searching the noise database 310. In this embodiment, the one or more of the aircraft noise sensors 210A1-AN to 210N1-NN include the aircraft noise sensors in the vicinity of the aircraft 202. For example, considering that the aircraft 202 is in the vicinity of the airport A, the predefined allowable aircraft noise level information associated with one or more of the aircraft noise sensors 210A1-AN in the airport A are obtained by the noise data searching module 316 from the noise database 310.

Furthermore in operation, the EFIS module 306 formats the obtained predefined allowable aircraft noise level information and presents the predefined allowable aircraft noise level information on the lateral profile display 322A1 of the navigation display device 322A. This is explained in detail with reference to FIG. 4. For example, the EFIS module 306 is configured to obtain, format and present the predefined allowable aircraft noise level information on the lateral profile display 322A1 of the navigation display 322A. The EFIS module 306 presents the predefined allowable aircraft noise level information on the lateral profile display 322A1 of the navigation display device 322A using navigation data in the navigation database 308. Exemplary navigation data includes waypoints, non-directional beacons (NDBs), location of airports, distance between the waypoints, a flight path, starting and ending positions of each leg of the flight path and the like.

In addition in operation, one of the aircraft noise sensors 210A1-AN, for example the aircraft noise sensor 210A1, shown in FIG. 2, located in the zone where the aircraft 202 is about to fly over, senses and records the current aircraft noise level induced by the aircraft 202. The recorded current aircraft noise level information is then transmitted to the aircraft 202. This is explained in detail with reference to FIG. 2.

Moreover in operation, the communication management unit 320 in the aircraft 202 receives the current aircraft noise level information. Further, the flight path planning module 314 obtains the current aircraft noise level information from the communication management unit 320. Particularly, the noise data comparison module 318 in the flight path planning module 314 obtains the current aircraft noise level information. Furthermore, the noise data comparison module 318 compares the current aircraft noise level information with the predefined allowable aircraft noise level information associated with the aircraft noise sensor 210A1. The predefined allowable aircraft noise level information associated with the aircraft noise sensor 210A1 is obtained from the noise database 310. The flight path planning module 314 then stores the outcome of the comparison in the flight plan and other data stores 312.

Also in operation, the EFIS module 306 obtains the outcome of the comparison from the flight plan and other data stores 312. The EFIS module 306 then computes the aircraft noise advisory based on the outcome of the comparison and displays the aircraft noise advisory on the navigation display device 322A and the flight warning and alert display device 322B if the current aircraft noise level of the aircraft 202 is exceeding the predefined allowable aircraft noise level information associated with the aircraft noise sensor 210A1. For example, the EFIS module 306 displays the aircraft noise advisory on the navigation display device 322A and the flight warning and alert display device 322B using the navigation data in the navigation database 308. The aircraft noise advisory includes suggested aircraft performance parameters and a predicted flight path based on the suggested aircraft performance parameters. Exemplary suggested aircraft performance parameters include an aircraft speed, an aircraft thrust, an aircraft altitude, an aircraft climb/descent rate, an aircraft flap setting and the like.

In one embodiment, the suggested aircraft performance parameters are displayed on the flight warning and alert display device 322B or any other display device in the aircraft 202 capable of displaying the suggested aircraft performance parameters is textual format and the predicted flight path is displayed on the navigation display device 322A. The displayed suggested aircraft performance parameters suggests the pilot to perform certain actions in order to reduce the current aircraft noise level to the predefined allowable aircraft noise level associated with the aircraft noise sensor 210A1. For example, the current aircraft noise level is reduced to the predefined allowable aircraft noise level or below the predefined allowable aircraft noise level. Further, the suggested aircraft performance parameters are displayed to the pilot based on a current flying profile of the aircraft 202. The predicted flight path, displayed on the navigation display device 322A, is a flight path which the aircraft 202 will follow if the suggested aircraft performance parameters are executed by the pilot. This is explained in detail with reference to FIG. 5.

In one embodiment, the aircraft noise advisory includes displaying an alert message to the pilot. For example, when the current aircraft noise level exceeds the predefined allowable aircraft noise level associated with an aircraft noise sensor, the alert message is displayed on the navigation display device 322A indicating the pilot to follow the suggested aircraft performance parameters displayed on the flight warning and alert display device 322B.

Figure 4:
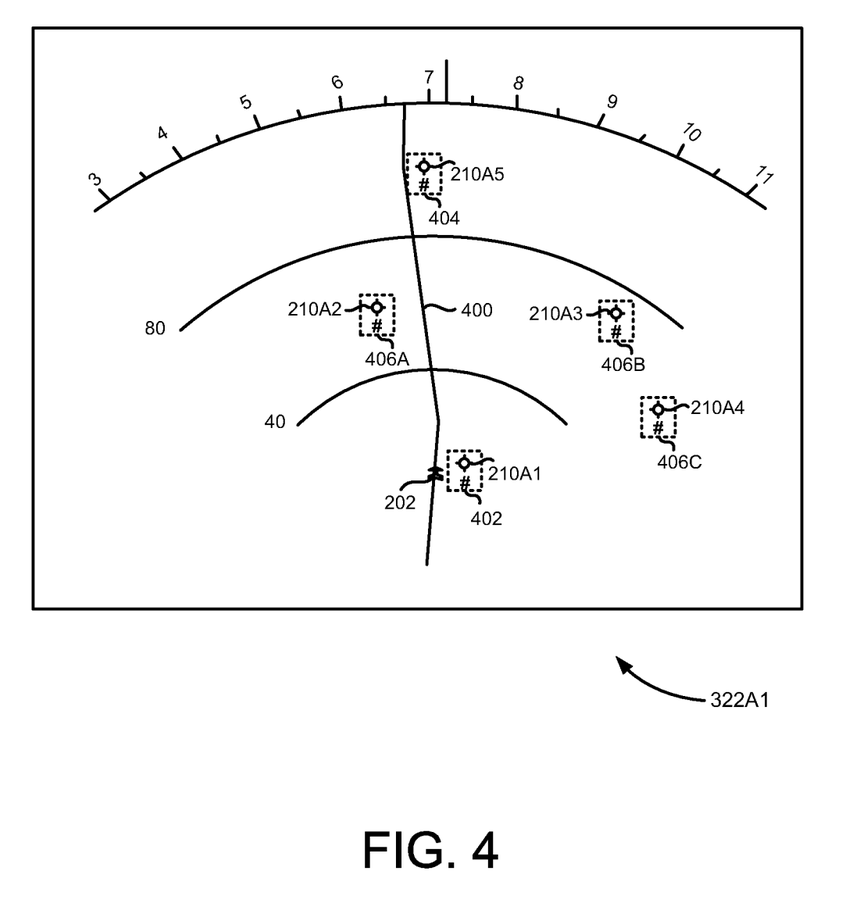
FIG. 4 illustrates a lateral profile display of a navigation display device, such as the one shown in FIG. 3, displaying predefined allowable aircraft noise level information associated with one or more aircraft noise sensors located in the vicinity of the aircraft, according to one embodiment.

Referring now to FIG. 4, which illustrates the lateral profile display 322A1 of the navigation display device 322A, such as the one shown in FIG. 3, displaying the predefined allowable aircraft noise level information associated with the one or more of the plurality of aircraft noise sensors 210A1-AN to 210N1-NN located in the vicinity of the aircraft 202, according to one embodiment. Particularly, FIG. 4 illustrates a lateral profile of a flight path 400 of the aircraft 202 displayed on the lateral profile display 322A1 of the navigation display device 322A. Further as shown, based on the current location of the aircraft 202, the one or more of the aircraft noise sensors 210A1-AN to 210N1-NN along with the associated predefined allowable aircraft noise level information are displayed on the lateral profile display 322A1 by the EFIS module 306, shown in FIG. 3.

For example, one or more of the aircraft noise sensors 210A1-AN, located in the vicinity of the aircraft 202, are displayed on the lateral profile display 322A1 when the aircraft 202 is in the vicinity of the airport A. Further, a predefined allowable aircraft noise level information and an aircraft noise sensor identification associated with each of the one or more of the aircraft noise sensors 210A1-AN are also displayed on the lateral profile display 322A1. As shown in FIG. 4, 402 illustrates the aircraft noise sensor location information, predefined allowable aircraft noise level information and aircraft noise sensor identification associated with the aircraft noise sensor 210A1. For example, as shown in FIG. 4, the aircraft 202 is about to fly over the aircraft noise sensor 210A1. Therefore, the aircraft noise sensor 210A1 is an active aircraft noise sensor which senses the current aircraft noise level of the aircraft 202 and transmits back the sensed current aircraft noise level information to the aircraft 202. This is explained in detail with reference to FIG. 2. Furthermore, the FMS 204, such as the one shown in FIG. 2, in the aircraft 202 compares the current aircraft noise level information with the predefined allowable aircraft noise level associated with the aircraft noise sensor 210A1 to provide appropriate aircraft noise advisory to the pilot. This is explained in detail with reference to FIG. 3.

Further in this embodiment, 406A-C illustrate the aircraft noise sensor location information, predefined allowable aircraft noise level information and aircraft noise sensor identifications associated with the aircraft noise sensors 210A2-210A4, respectively. The aircraft noise sensors 210A2-210A4 are in the vicinity of the aircraft 202. However, the aircraft noise sensors 210A2-210A4 are away from the flight path 400. The aircraft 202 may fly over any one of the aircraft noise sensors 210A2-210A4 if the flight path of the aircraft 202 is deviated from the flight path 400.

Furthermore in this embodiment, 404 illustrates the aircraft noise sensor location information, predefined allowable aircraft noise level information and aircraft noise sensor identification associated with the aircraft noise sensor 210A5. The aircraft noise sensor 210A5 is located along the flight path 400. The aircraft 202 will fly over the aircraft noise sensor 210A5 at a later time.

Figure 5:
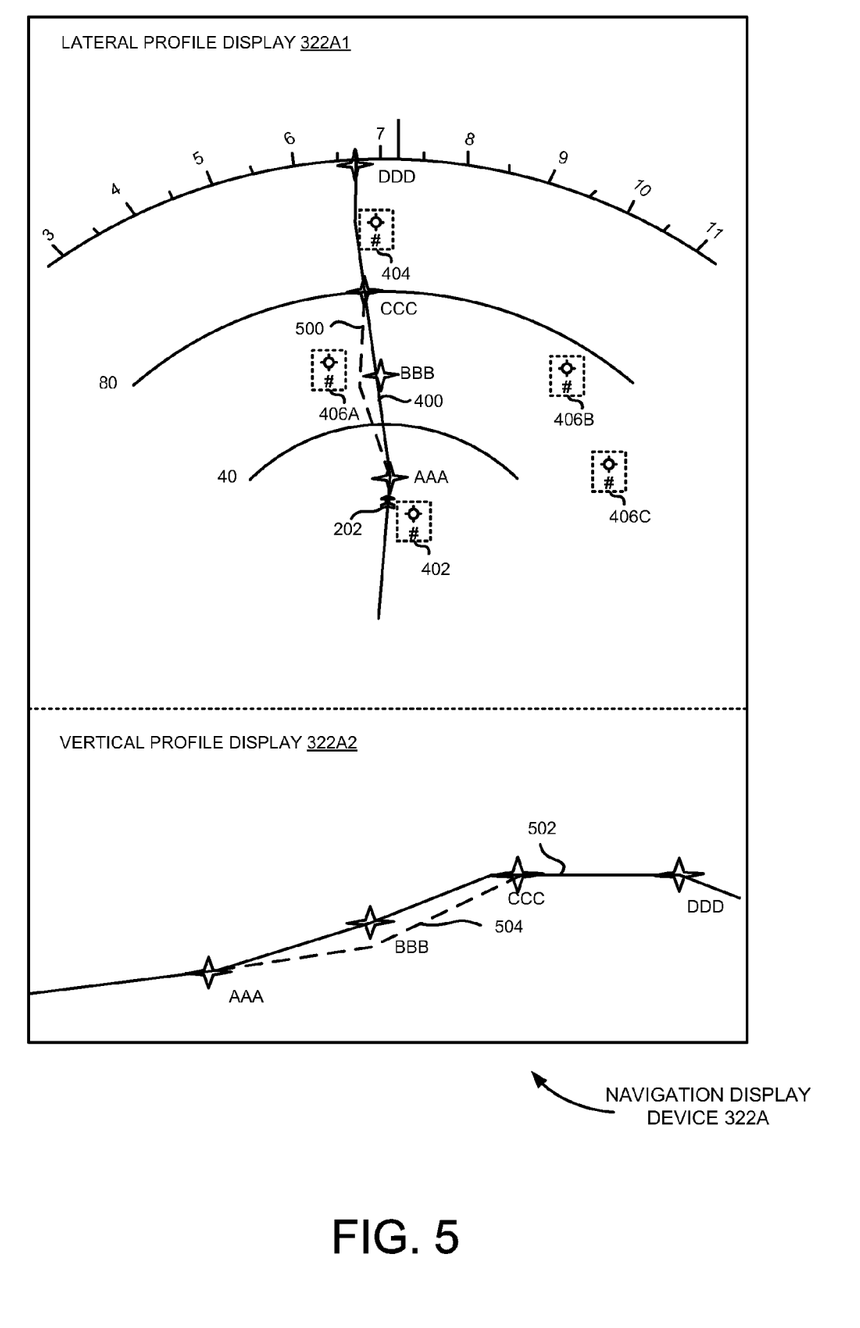
FIG. 5 illustrates the navigation display device, such as the one shown in FIG. 3, displaying a lateral profile of predicted flight path and a vertical profile of predicted flight path, according to one embodiment.

Referring now to FIG. 5, which illustrates the navigation display device 322A, such as the one shown in FIG. 3, displaying a lateral profile of predicted flight path 500 and a vertical profile of predicted flight path 504, according to one embodiment. Particularly, FIG. 5 illustrates the lateral profile of predicted flight path 500 and the vertical profile of predicted flight path 504 obtained by modifying the flight path 400 based on the suggested aircraft performance parameters. As shown in FIG. 5, the flight path 400 is displayed in lateral profile on the lateral profile display 322A1. Further as shown in FIG. 5, the flight path 400 is displayed in vertical profile on the vertical profile display 322A1. The vertical profile of the flight path 400 is indicated by 502.

In addition as shown in FIG. 5, the lateral profile display 322A1 illustrates the lateral profile of predicted flight path 500 (i.e., the predicted flight path as seen from overhead). Moreover as shown in FIG. 5, the vertical profile display 322A2 illustrates the vertical profile of predicted flight path 504 (i.e., the predicted flight path as seen from a side).

In one embodiment, based on the suggested aircraft performance parameters, the lateral profile of predicted flight path 500 and the vertical profile of predicted flight path 504 are computed by the EFIS module 306, shown in FIG. 3. For example, the lateral profile of predicted flight path 500 and the vertical profile of predicted flight path 504 are computed from the current location of the aircraft 202 (indicated by a waypoint AAA) up to an altitude and location of the aircraft 202 where the aircraft noise correction may not be required (indicated by a waypoint CCC). For example, the lateral profile of predicted flight path 500 and the vertical profile of predicted flight path 504 are computed based on an aircraft vertical speed, an aircraft horizontal speed, distance traveled by the aircraft, an altitude change, fuel burnt and the like which are determined based on the suggested aircraft performance parameters. Further, the computed lateral profile of predicted flight path 500 and vertical profile of predicted flight path 504 are displayed to the pilot in the aircraft 202 on the lateral profile display 322A1 and the vertical profile display 322A2, respectively, to enable the pilot to determine whether the lateral profile of predicted flight path 500 and vertical profile of predicted flight path 504 confines to safety of the aircraft 202.

Figure 6:
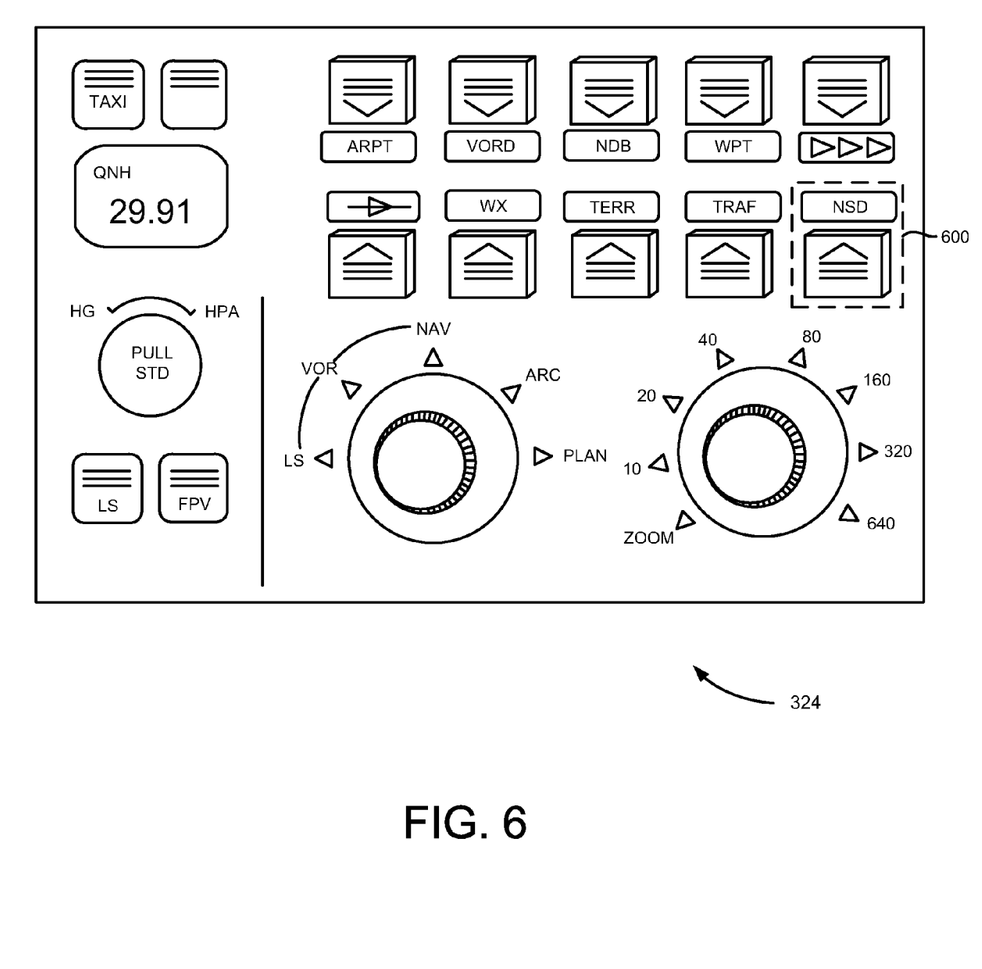
FIG. 6 illustrates an electronic flight instrumentation system control panel (ECP), such as the one shown in FIG. 3, including a noise data option switch, according to one embodiment.

Referring now to FIG. 6, which illustrates the ECP 324 including the NSD 600 employed in the aircraft 202, according to one embodiment. Particularly, FIG. 6 illustrates various control switches on the ECP 324. The various control switches on the ECP 324, shown in FIG. 6, enable displaying various information on the cockpit display devices 322. For example, selecting an airport option selection switch (ARPT) by the pilot displays airports in the vicinity of the current location of the aircraft 202, in the form of standard airport symbols, on the navigation display device 322A.

In this embodiment, upon selecting the NSD 600 by the pilot the noise data request is sent to the FMS 204. This enables displaying the aircraft noise sensor location information, the predefined allowable aircraft noise level information and the aircraft noise sensor identification associated with the one or more of the aircraft noise sensors 210A1-AN to 210N1-NN, based on the current location of the aircraft 202, on the navigation display device 322A. Further, the lateral profile of predicted flight path 500 and vertical profile of predicted flight path 504 are displayed on the lateral profile display 322A1 and vertical profile display 322A2, respectively, of the navigation display device 322A. Furthermore, the suggested aircraft performance parameters are displayed on the flight warning and alert display device 322B. This is explained in detail with reference to FIGS. 3 and 4.

In various embodiments, the systems and methods of FIGS. 1 to 6 enable providing the predefined allowable aircraft noise level information associated with aircraft noise sensors located in the vicinity of the aircraft and the aircraft noise advisory to the pilot. The aircraft noise advisory is provided to the pilot in the form of a low priority alert message. Further, the aircraft noise advisory is provided to the pilot upon selecting a noise data option switch. The pilot can enable and disable the aircraft noise advisory using the noise data option switch thus ensuring safety of the aircraft. Furthermore, the aircraft noise advisory enables the pilot to reduce the current aircraft noise level to predefined allowable aircraft noise level.

Although the present embodiments have been described with reference to specific example embodiments, it will be evident that various modifications and changes may be made to these embodiments without departing from the broader spirit and scope of the various embodiments. Furthermore, the various devices, modules, analyzers, generators, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

What is claimed is:

1. A method for providing an aircraft noise advisory during departure and/or arrival of an aircraft, comprising:
    obtaining predefined allowable aircraft noise level information associated with each of a plurality of aircraft noise sensors located in the vicinity of airports;
    presenting predefined allowable aircraft noise level information associated with one or more of the plurality of aircraft noise sensors on a display device in the aircraft, based on a current location of the aircraft, upon receiving a noise data request from a pilot;
    obtaining current aircraft noise level information from one of the one or more aircraft noise sensors during the departure and/or arrival;
    comparing the current aircraft noise level information with predefined allowable aircraft noise level information associated with the one of the one or more aircraft noise sensors; and
    displaying the aircraft noise advisory on the display device based on an outcome of the comparison, wherein the aircraft noise advisory comprises suggested aircraft performance parameters and a predicted flight path based on the suggested aircraft performance parameters.

2. The method of claim 1, further comprising:
    obtaining an aircraft noise sensor identification and aircraft noise sensor location information associated with each of the plurality of aircraft noise sensors.

3. The method of claim 2, further comprising:
    storing the obtained predefined allowable aircraft noise level information, aircraft noise sensor identification and/or aircraft noise sensor location information associated with each of the plurality of aircraft noise sensors in a noise database.

4. The method of claim 3, wherein presenting the predefined allowable aircraft noise level information associated with the one or more of the plurality of aircraft noise sensors on the display device in the aircraft, based on the current location of the aircraft, upon receiving the noise data request from the pilot comprises:
    obtaining the predefined allowable aircraft noise level information associated with the one or more of the plurality of aircraft noise sensors, based on the current location of the aircraft, by searching the noise database upon receiving the noise data request from the pilot; and
    presenting the obtained predefined allowable aircraft noise level information associated with the one or more of the plurality of aircraft noise sensors on the display device.

5. The method of claim 1, wherein, in obtaining the current aircraft noise level information from one of the one or more aircraft noise sensors during the departure and/or arrival, the one of the one or more aircraft noise sensors are located in a zone where the aircraft is about to fly over.

6. The method of claim 1, wherein the suggested aircraft performance parameters comprise parameters selected from the group consisting of an aircraft speed, an aircraft thrust, an aircraft altitude, an aircraft climb/descent rate and an aircraft flap setting.

7. The method of claim 1, wherein the aircraft noise advisory comprises displaying an alert message.

8. The method of claim 1, wherein the plurality of aircraft noise sensors comprises a plurality of fixed aircraft noise sensors and/or a plurality of mobile aircraft noise sensors.

9. The method of claim 1, wherein the display device in the aircraft comprises a navigation display device and/or a flight warning and alert display device.

10. An aircraft, comprising:
    a flight management system (FMS);
    a communication management unit coupled to the FMS; and
    cockpit display devices coupled to the FMS, wherein the cockpit display devices comprise a navigation display device and a flight warning and alert display device, wherein the FMS obtains predefined allowable aircraft noise level information associated with each of a plurality of aircraft noise sensors located in the vicinity of airports, wherein the FMS presents predefined allowable aircraft noise level information associated with one or more of the plurality of aircraft noise sensors on the navigation display device in the aircraft, based on a current location of the aircraft, upon receiving a noise data request from a pilot, wherein the communication management unit obtains current aircraft noise level information from one of the one or more aircraft noise sensors during departure and/or arrival of the aircraft, wherein the FMS compares the current aircraft noise level information with predefined allowable aircraft noise level information associated with the one of the one or more aircraft noise sensors, wherein the FMS displays the aircraft noise advisory, on the navigation display device and the flight warning and alert display device, based on an outcome of the comparison, and wherein the aircraft noise advisory comprises suggested aircraft performance parameters and a predicted flight path based on the suggested aircraft performance parameters.

11. The aircraft of claim 10, wherein the FMS further obtains an aircraft noise sensor identification and aircraft noise sensor location information associated with each of the plurality of aircraft noise sensors.

12. The aircraft of claim 11, wherein the FMS comprises:
    a processor;
    memory coupled to the processor; and
    an aircraft noise advisory generation module residing in the memory, wherein the aircraft noise advisory generation module comprises:
        a noise database to store the obtained predefined allowable aircraft noise level information, aircraft noise sensor identification and/or aircraft noise sensor location information associated with each of the plurality of aircraft noise sensors;
        a navigation module to store the current location of the aircraft; and an electronic flight instrumentation system (EFIS) module to obtain the current location of the aircraft from the navigation module.

13. The aircraft of claim 12, wherein the EFIS module further comprises:
a noise data searching module to obtain the predefined allowable aircraft noise level information associated with the one or more of the plurality of aircraft noise sensors, based on the current location of the aircraft, by searching the noise database.

14. The aircraft of claim 13, wherein the EFIS module is further configured to present the predefined allowable aircraft noise level information associated with the one or more of the plurality of aircraft noise sensors on the navigation display device in the aircraft, based on the current location of the aircraft, upon receiving the noise data request from the pilot.

15. The aircraft of claim 12, wherein the aircraft noise advisory generation module further comprises:
a flight path planning module to obtain the current aircraft noise level information from the communication management unit; and
a noise data comparison module residing in the flight path planning module to compare the current aircraft noise level information with the predefined allowable aircraft noise level information associated with the one of the one or more aircraft noise sensors.

16. The aircraft of claim 15, wherein the EFIS module is further configured to display the aircraft noise advisory, on the navigation display device and the flight warning and alert display device, based on the outcome of the comparison.

17. The aircraft of claim 16, wherein the aircraft noise advisory generation module further comprises:
a navigation database to store navigation data, wherein the EFIS module displays the aircraft noise advisory using navigation data in the navigation database.

18. The aircraft of claim 17, wherein the navigation data comprises data selected from the group consisting of waypoints, non-directional beacons (NDBs), location of airports, distance between the waypoints, a flight path and starting and ending positions of each leg of the flight path.

19. The aircraft of claim 10, wherein the suggested aircraft performance parameters comprise parameters selected from the group consisting of an aircraft speed, an aircraft thrust, an aircraft altitude, an aircraft climb/descent rate and an aircraft flap setting.

20. The aircraft of claim 10, wherein displaying the aircraft noise advisory, on the navigation display device and the flight warning and alert display device, based on the outcome of the comparison, by the EFIS module comprises:
displaying the suggested aircraft performance parameters on the flight warning and alert display device; and
displaying the predicted flight path on the navigation display device.

21. The aircraft of claim 10, wherein, in obtaining the current aircraft noise level information from one of the one or more aircraft noise sensors during the departure and/or, the one of the one or more aircraft noise sensors are located in a zone where the aircraft is about to fly over.

22. A system for providing an aircraft noise advisory during departure and/or arrival of an aircraft, comprising:
a plurality of aircraft noise sensors;
a plurality of aircraft noise monitoring stations, wherein each of the plurality of aircraft noise monitoring stations is coupled to associated one or more of the plurality of aircraft noise sensors;
a plurality of airline operable stations, wherein each of the plurality of airline operable stations is coupled to an associated one of the plurality of aircraft noise monitoring stations; and
a flight management system (FMS) in the aircraft communicatively coupled to one of the plurality of aircraft noise monitoring stations via an associated one of the plurality of airline operable stations, wherein the FMS obtains predefined allowable aircraft noise level information associated with each of the plurality of aircraft noise sensors located in the vicinity of airports, wherein the FMS presents predefined allowable aircraft noise level information associated with one or more of the plurality of aircraft noise sensors on a display device in the aircraft, based on a current location of the aircraft, upon receiving a noise data request from a pilot, wherein the FMS obtains current aircraft noise level information from one of the one or more aircraft noise sensors via the associated one of the plurality of aircraft noise monitoring stations and the associated one of the plurality of airline operable stations during the departure and/or arrival, wherein the FMS compares the current aircraft noise level information with predefined allowable aircraft noise level information associated with the one of the one or more aircraft noise sensors, wherein the FMS displays the aircraft noise advisory on the display device based on an outcome of the comparison, and wherein the aircraft noise advisory comprises suggested aircraft performance parameters and a predicted flight path based on the suggested aircraft performance parameters.

23. The system of claim 22, wherein the FMS further obtains an aircraft noise sensor identification and aircraft noise sensor location information associated with each of the plurality of aircraft noise sensors.

24. The system of claim 23, wherein the FMS further stores the obtained predefined allowable aircraft noise level information, aircraft noise sensor identification and/or aircraft noise sensor location information associated with each of the plurality of aircraft noise sensors in a noise database.

25. The system of claim 24, wherein the FMS obtains the predefined allowable aircraft noise level information associated with the one or more of the plurality of aircraft noise sensors, based on the current location of the aircraft, by searching the noise database upon receiving the noise data request from the pilot.

26. The system of claim 22, wherein, in obtaining the current aircraft noise level information from one of the one or more aircraft noise sensors during the departure and/or arrival, the one of the one or more aircraft noise sensors are located in a zone where the aircraft is about to fly over.

27. The system of claim 22, wherein the display device in the aircraft comprises a navigation display device and a flight warning and alert display device.

28. At least one non-transitory computer-readable storage medium for providing an aircraft noise advisory during departure and/or arrival of an aircraft, having instructions that, when executed by a computing device cause the computing device to:
obtain predefined allowable aircraft noise level information associated with each of a plurality of aircraft noise sensors located in the vicinity of airports;
present predefined allowable aircraft noise level information associated with one or more of the plurality of aircraft noise sensors on a display device in an aircraft, based on a current location of the aircraft, upon receiving a noise data request from a pilot;

obtain current aircraft noise level information from one of the one or more aircraft noise sensors during the departure and/or arrival;

compare the current aircraft noise level information with predefined allowable aircraft noise level information associated with the one of the one or more aircraft noise sensors; and display the aircraft noise advisory on the display device based on the outcome of the comparison, wherein the aircraft noise advisory comprises suggested aircraft performance parameters and a predicted flight path based on the suggested aircraft performance parameters.

29. The at least one non-transitory computer-readable storage medium of claim 28, further comprising:

obtaining an aircraft noise sensor identification and aircraft noise sensor location information associated with each of the plurality of aircraft noise sensors.

30. The at least one non-transitory computer-readable storage medium of claim 29, further comprising:

storing the obtained predefined allowable aircraft noise level information, aircraft noise sensor identification and/or aircraft noise sensor location information associated with each of the plurality of aircraft noise sensors in a noise database.

31. The at least one non-transitory computer-readable storage medium of claim 30, wherein presenting the predefined allowable aircraft noise level information associated with the one or more of the plurality of aircraft noise sensors on the display device in the aircraft, based on the current location of the aircraft, upon receiving the noise data request from the pilot comprises:

obtaining the predefined allowable aircraft noise level information associated with the one or more of the plurality of aircraft noise sensors, based on the current location of the aircraft, by searching the noise database upon receiving the noise data request from the pilot; and presenting the obtained predefined allowable aircraft noise level information associated with the one or more of the plurality of aircraft noise sensors on the display device.

* * * * *